(12) United States Patent
Ueno

(10) Patent No.: US 11,345,036 B2
(45) Date of Patent: May 31, 2022

(54) ROBOT CONTROL DEVICE, ROBOT CONTROL SYSTEM, AND ROBOT CONTROL METHOD

(71) Applicant: FANUC CORPORATION, Yamanashi (JP)

(72) Inventor: Masahiro Ueno, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 238 days.

(21) Appl. No.: 16/667,069

(22) Filed: Oct. 29, 2019

(65) Prior Publication Data

US 2020/0198148 A1 Jun. 25, 2020

(30) Foreign Application Priority Data

Dec. 19, 2018 (JP) .............................. JP2018-237097

(51) Int. Cl.
*B25J 9/16* (2006.01)

(52) U.S. Cl.
CPC ........... *B25J 9/1676* (2013.01); *B25J 9/1697* (2013.01); *G05B 2219/40202* (2013.01)

(58) Field of Classification Search
CPC ...... B25J 9/1666; B25J 9/1674; B25J 9/1676; B25J 9/1605; B25J 9/1671; G05B 2219/40202
See application file for complete search history.

(56) References Cited

U.S. PATENT DOCUMENTS

| | | | |
|---|---|---|---|
| 9,227,323 B1 * | 1/2016 | Konolige | H04N 5/33 |
| 2015/0158178 A1 * | 6/2015 | Burmeister | B25J 9/1697 |
| | | | 382/203 |
| 2016/0345929 A1 * | 12/2016 | Azizian | A61B 6/102 |
| 2017/0080565 A1 * | 3/2017 | Dalibard | B25J 9/1697 |
| 2018/0218585 A1 * | 8/2018 | Schwabenthan | B25J 9/1674 |
| 2020/0086482 A1 * | 3/2020 | Johnson | B25J 9/16 |

FOREIGN PATENT DOCUMENTS

| | | |
|---|---|---|
| JP | 2007-319944 | 12/2007 |
| JP | 2010-120139 | 6/2010 |
| JP | 2010-208002 | 9/2010 |
| JP | 2011-042011 | 3/2011 |
| JP | 6403920 | 10/2018 |
| WO | 2017/203937 | 11/2017 |

OTHER PUBLICATIONS

Notification of Reasons for Refusal dated Mar. 30, 2021 in corresponding Japanese Patent Application No. 2018-237097.

* cited by examiner

*Primary Examiner* — Spencer D Patton
(74) *Attorney, Agent, or Firm* — Wenderoth, Lind & Ponack, L.L.P.

(57) ABSTRACT

A robot control device is configured to control a robot operating in a shared work area with an operator. The robot control device includes a distance estimation unit configured to obtain a reachable range of the operator on the basis of information on position and information on physical characteristics of the operator, and obtain a distance between the reachable range and the robot on the basis of information on position and information on shape of the robot and the reachable range, an interference probability calculation unit configured to obtain an interference probability between the robot and the operator on the basis of the distance, and an operation control unit configured to control operation of the robot on the basis of the interference probability.

6 Claims, 5 Drawing Sheets

ROBOT CONTROL DEVICE, ROBOT CONTROL SYSTEM, AND ROBOT CONTROL METHOD

This application is based on and claims the benefit of priority from Japanese Patent Application No. 2018-237097, filed on 19 Dec. 2018, the content of which is incorporated herein by reference.

BACKGROUND OF THE INVENTION

Field of the Invention

The present invention relates to a robot control device, a robot control system, and a robot control method for controlling a robot, and more specifically relates to a robot control device, a robot control system and a robot control method for controlling a robot operating in a shared work area with an operator.

Related Art

Conventionally, in the field of an industrial robot and the like, a robot and an operator work in a work area shared with each other in some case, in order to increase the efficiency of production and assembly. In this case, it is undesirable that the robot and the operator may interfere with each other, and the robot and the operator may come into contact with each other in the work area. A prior art for preventing such interference from occurring is known (refer to, for example, Patent Document 1).

Patent Document 1 discloses that "A robot control device is configured to control a robot working in a shared workspace with an operator performing at least one work process with the work action set previously. The robot control device comprises a robot control state measuring unit that measures a robot control state that includes the position and the posture of a robot; a work area setting unit that stores, for each work process, an area that contains the space occupied by the body of an operator in work actions performed by the operator from the start to the end of the work process, and that sets a work area corresponding to the current work process of the operator on the basis of a work process specifying signal that specifies the work process that is currently being performed by the operator; and a robot command generating unit that generates an operation command for the robot on the basis of the work area and the robot control state. The robot command generating unit changes the operation command for the robot in accordance with whether the robot is inside the work area.

Patent Document 1: Pamphlet of PCT International Publication No. WO2017/203937

SUMMARY OF THE INVENTION

In the case where a robot and an operator work in a shared work area, the operator may perform an action unrelated to the work operation, for example, an action of unexpectedly stretching out the arm. Taking into consideration such a case, a technique for preventing such interference from occurring between the robot and the operator is desired.

(1) A robot control device according to one aspect of the present disclosure (for example, a robot control device 100 to be described below) is configured to control a robot operating in a shared work area with an operator. The robot control device includes a distance estimation unit (for example, a distance estimation unit 102 to be described below) configured to obtain a reachable range of the operator on the basis of information on position and information on physical characteristics of the operator, and obtain a distance between the reachable range and the robot, on the basis of information on position and information on shape of the robot and the reachable range, an interference probability calculation unit (for example, an interference probability calculation unit 103 to be described below) configured to obtain an interference probability between the robot and the operator on the basis of the distance, and an operation control unit (for example, an operation control unit 104 to be described below) configured to control operation of the robot on the basis of the interference probability.

(2) In the robot control device according to (1), the operation control unit may determine a speed of an arm of the robot on the basis of the interference probability.

(3) In the robot control device according to (2), the operation control unit may determine the speed of the arm of the robot depending on a moving direction of the arm of the robot.

(4) in the robot control device according to any one of (1) to (3), a bar code or a QR code (registered trademark) (for example, a QR code 420 or 210) may be attached to the operator and the robot, respectively, and the bar code or the QR code (for example, a QR code 420) attached to the operator may include information indicating an operator ID and physical characteristics of the operator, and the bar code or the QR code (for example, a QR code 210) attached to the robot may include information indicating a robot ID and a robot size.

(5) A robot control system according to one aspect of the present disclosure includes the robot control device according to any one of (1) to (4), a robot configured to be controlled by the robot control device, and a camera configured to capture images of an operator and the robot.

(6) A robot control method according to one aspect of the present disclosure is provided for a robot control device (for example, a robot control device 100 to be described below) configured to control a robot operating in a shared work area with an operator. The robot control method includes the steps of obtaining a reachable range of the operator on the basis of information on position and information on physical characteristics of the operator, obtaining a distance between the reachable range and the robot on the basis of information on position and information on shape or the robot and the reachable range, obtaining an interference probability between the robot and the operator on the basis of the distance, and controlling operation of the robot on the basis of the interference probability.

One aspect of the present disclosure enables to make a robot operate so as to avoid interference from occurring between an operator and the robot even when the operator performs an action unrelated to work operation.

DETAILED DESCRIPTION OF THE INVENTION

<Overall Configuration of Embodiment>

Figure 1:
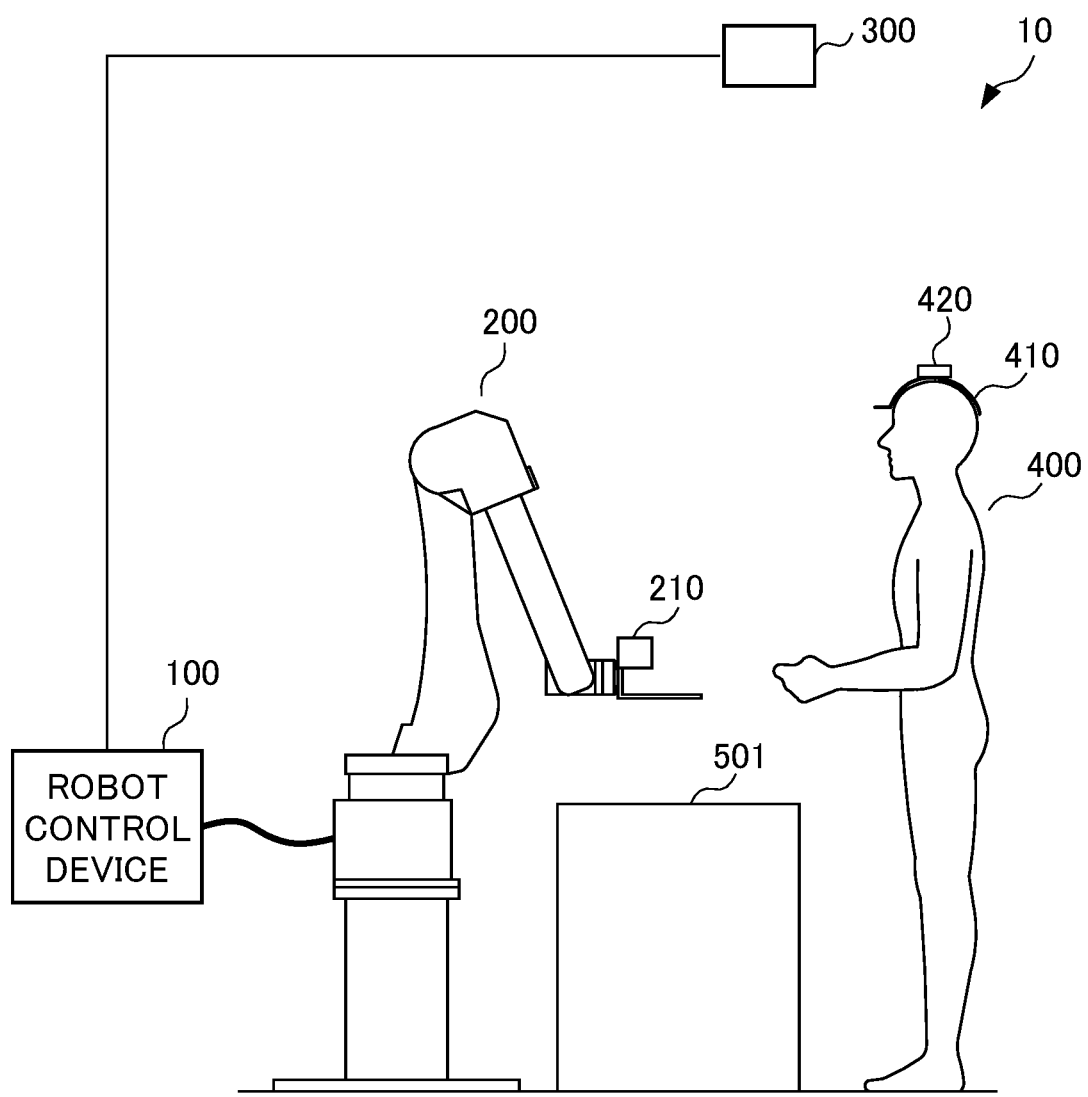
FIG. 1 is a schematic diagram illustrating the overall configuration of a robot control system according to one embodiment of the present invention.

The overall configuration of a robot control system 10 according to the present embodiment is described first by referring to FIG. 1. As shown in FIG. 1, the robot control system 10 includes a robot control device 100, a robot 200 and a camera 300. An operator 400 and a work table 501 are illustrated in the drawing. The operator 400 wears a working cap (also referred to as a protective cap) 410 with a QR code (registered trademark) 420 attached to the head top.

The robot control device 100 and the robot 200 are communicably connected to each other. The robot control device 100 and the camera 300 are also communicably connected to each other. Such connection may be wired connection via signal lines or wireless connection. Alternatively, such connection may be performed via, for example, a network such as a LAN (local area network) or the Internet. The robot control device 100 mutually communicate with the robot 200 and the camera 300 by such connection.

The robot control device 100 is configured to control the operation of the robot 200. The robot control device 100 includes various functional blocks for controlling the operation of the robot 200. These functional blocks will be detailed below by referring to FIG. 4. The robot control device 100 is realized by adding a function specific to the present embodiment to a general robot control device (robot controller).

The robot 200 is configured to be operated on the basis of the control by the robot control device 100. The robot 200 includes movable parts operated on the basis of the control by the robot control device 100, such as an arm and an end effector (for example, a gripper for gripping a workpiece). A QR code (registered trademark) 210 is provided at the tip of the end effector of the robot control device 100. The robot 200 is a general industrial robot for use in a factory in which, for example, automobiles, home electric appliances, or electronic components are manufactured.

The camera 300 is configured to capture images of an operator and a robot in the vicinity of the work table 501. The camera 300 is installed, for example, on a ceiling so as to be able to capture images of the QR code 210 provided at the tip of the end effector of the robot 200 and the QR code 420 attached to the head top of the working cap 410, when the robot 200 and the operator 400 are positioned in the vicinity of the work table 501. The image data captured by the camera 300 is output to the robot control device 100. It is noted that, although the case of one unit of the camera 300 provided is described in the present embodiment, a plurality of cameras may be provided.

The QR code 210 includes information such as a robot ID (for example, a robot identification number) and a robot size. The information on robot size includes information such as the lengths of an arm and an end effector, and the diameters of the arm and the end effector. The QR code 420 includes information such as an ID (for example, operator identification number) and physical characteristics of an operator. The information on physical characteristics of operator includes a shoulder width and the lengths of left and right arms, and thus by use of such information, the span of operator's arms is able to be calculated. The QR code 420 may include a span of operator's arms as information on physical characteristics. The QR code 210 and the OR code 420 may be of bar codes.

Figure 2:
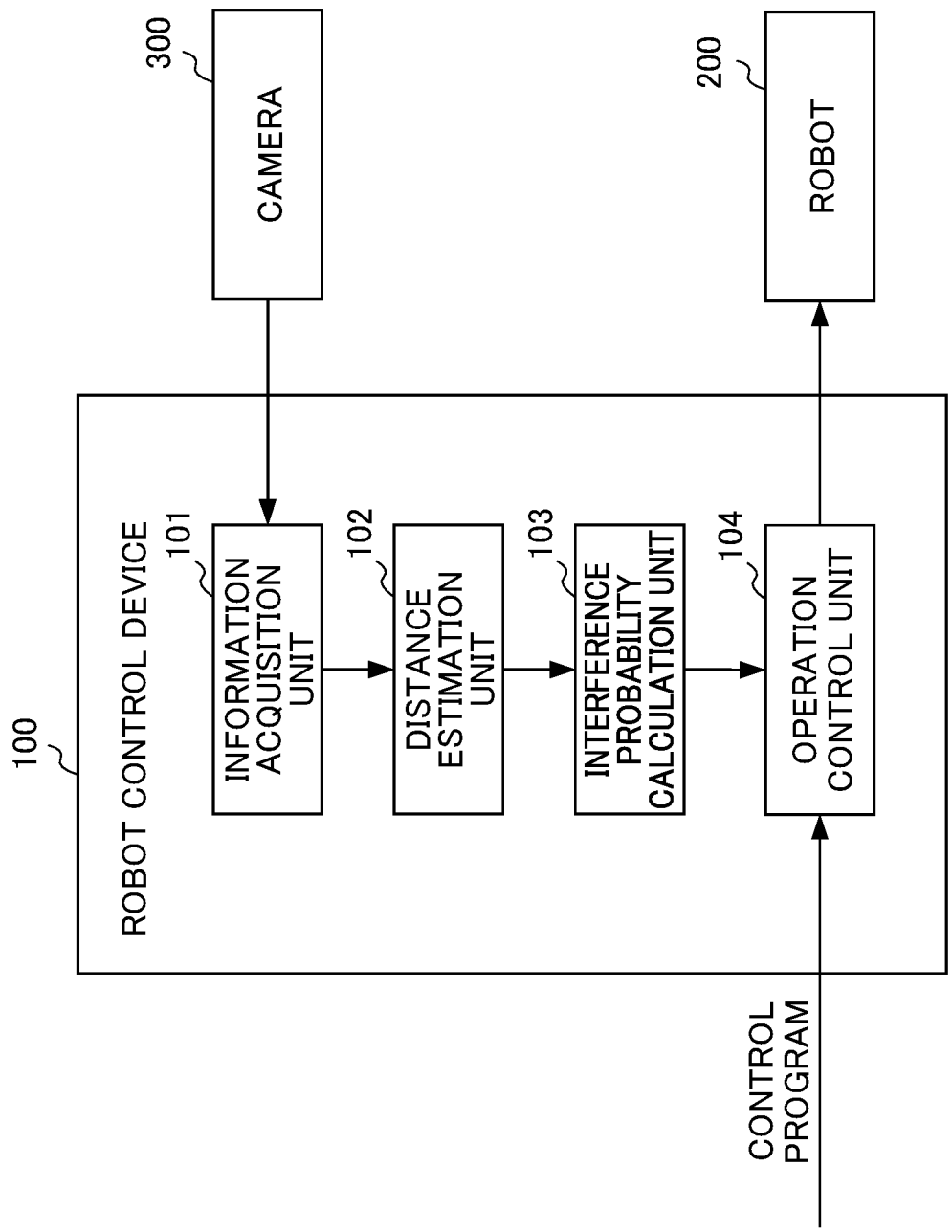
FIG. 2 shows the functional blocks of a robot control device according to the embodiment of the present invention.

FIG. 2 shows the functional blocks of the robot control device according to the embodiment of the present invention. As shown in FIG. 2, the robot control device 100 includes an information acquisition unit 101, a distance estimation unit 102, an interference probability calculation unit 103, and an operation control unit 104.

The information acquisition unit 101 acquires the image data including the QR code (registered trademark) 210 and the QR code 420 from the camera 300, and transmits the image data to the distance estimation unit 102.

The distance estimation unit 102 obtains a distance d between the robot 200 and the reachable range of the operator 400 by using the image data. The distance is obtained by the following steps (1) to (4).

(1) The distance estimation unit 102 obtains the position of the tip of the end effector of the robot 200 and the position of the head top of the working cap of the operator 400, by detecting the positions of the QR code 210 and the QR code 420 having square shapes in the imaging area of the camera 300.

(2) The distance estimation unit 102 reads the information on physical characteristics of the operator 400 described in the QR code 420, for example, the shoulder width and the lengths of the left and right arms, and calculates the span of the arms of the operator 400. The distance estimation unit 102 obtains a reachable range A of the operator 400 shown in FIG. 3, on the basis of the position of the QR code 420 and the span of the arms of the operator 400. In the present embodiment, the circular range centering on the position of the QR code 420 of the operator when the operator 400 spreads out the arms is set as the reachable range. Alternatively, taking into consideration the case where the operator 400 stretches out the hand when stooping, a range wider than the range of the span of the arms of the operator 400 may be set as the reachable range. It is noted that, since the operator 400 rarely stretches out the hand rearward in general during operation, a semicircular range on the front side (chest side) of the operator may be set as the reachable range.

(3) The distance estimation unit 102 reads information on robot shape described in the QR code 210, for example, the lengths of the arm and the end effector, and the diameters of the arm and the end effector, and obtains a straight line L which passes the side surface of the arm or the end effector positioned closest to the operator 400, on the basis of the read information and the position of the QR code 210.

Figure 3:
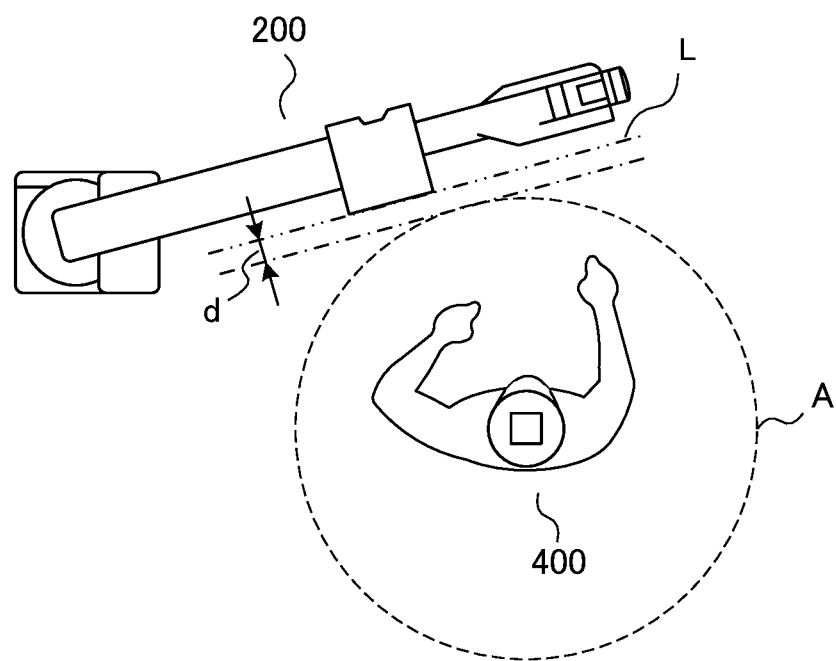
FIG. 3 shows a positional relation and a distance between an operator and a robot.

(4) The distance estimation unit 102 obtains the distance d between the obtained straight-line L and the reachable range A of the hand, as shown in FIG. 3. The distance d corresponds to the distance between the reachable range and the robot. The distance estimation unit 102 transmits the obtained distance d to the interference probability calculation unit 103.

The interference probability calculation unit 103 calculates an interference probability between the robot 200 and the operator 400 by using the distance d. In the present embodiment, an interference probability depends on the overlap condition between the reachable range of an operator and the arm of the robot 200, and an interference probability is calculated as follows.

The interference probability calculation unit 103 obtains 0% as the interference probability, in the case where the distance d between the circular reachable range determined by the physical characteristics of the operator 400 and the arm of the robot 200 is larger than a threshold Th. The interference probability calculation unit 103 obtains 50% as the interference probability, in the case where the distance d is smaller than the threshold Th and larger than 0. The interference probability calculation unit 103 obtains 100% as the interference probability, in the case where the distance d is 0 or less (overlapped condition). The interference probability calculation unit 103 transmits the resultant interference probability to the operation control unit 104.

The operation control unit 104 controls the operation of the arm and the end effector of the robot 200 on the basis of a control program. In the case where the interference probability is 0%, the operation control unit 104 controls the arm of the robot 200 to operate at the speed (normal speed) set by the control program. In the case where the interference probability is 100%, the operation control unit 104 controls the arm of the robot 200 to stop. In the case where the interference probability is 50%, the operation control unit 104 controls the arm of the robot 200 to operate at a speed of, for example, approximately 20% to the normal speed in the present embodiment, the interference probability is divided into three levels. Alternatively, in the case where the distance d is smaller than the threshold Th and larger than 0, the interference probability may be divided into a plurality of levels of, for example, 10%, 30%, 50% and 70%, depending on the value of the distance d. The speed of the arm is controlled stepwise on the basis of the value of the interference probability.

It is noted that, in the case where the interference probability between the robot 200 and the operator 400 is 100%, the operation control unit 104 preferably controls the arm of the robot 200 to move to the position where the interference probability is 50% or less and to stop at the position, and controls the arm of the robot 200 to return to the original position after the interference with the operator is avoided.

The operation control unit 104 controls the speed of the arm depending on the direction of the arm to be controlled to move by the control program. In an example, in the case where the interference probability is 100%, the operation control unit 104 controls the arm of the robot 200 to stop during when the arm is approaching the operator 400, while the operation control unit 104 controls the arm of the robot 200 to operate at the normal speed during when the arm is moving away from the operator 400. The moving direction of the arm of the robot 200 is able to be obtained on the basis of the control program, or alternatively may be obtained by obtaining the change of the distance d and then determining whether the distance d is increasing or decreasing.

Figure 4:
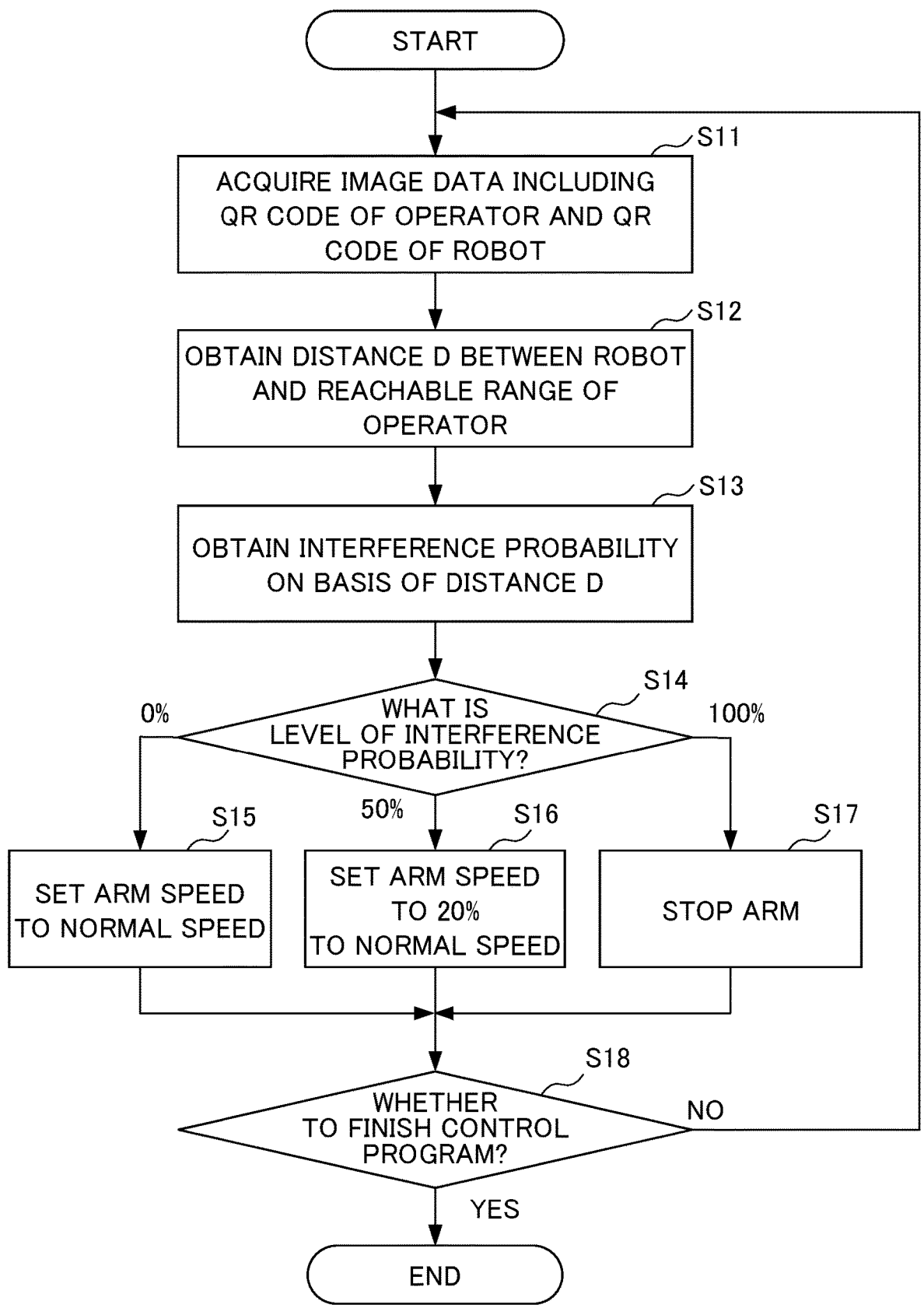
FIG. 4 is a flowchart indicating the operation of the robot control device.

The operation of the above-described robot control device 100 is described by referring to the flowchart of FIG. 4. The description below is made, assuming that the arm of the robot 200 moves to approach the operator 400. In step S11, the information acquisition unit 101 acquires the image data including the QR code (registered trademark) 210 and the QR code 420 from the camera 300. In step S12, the distance estimation unit 102 obtains the distance d between the robot 200 and the reachable range of the operator 400 by using the image data. In step S13, the interference probability calculation unit 103 obtains an interference probability on the basis of the distance d. Then in step S14, the value of the interference probability is determined. In the case where the interference probability is 0%, then in step S15, the operation control unit 104 controls the robot 200 to operate at the normal speed. In the case where the interference probability is 50%, then in step S16, the operation control unit 104 controls the robot 200 to operate at a speed of approximately 20% to the normal speed. In the case where the interference probability is 100%, then in step S17, the operation control unit 104 controls the robot 200 to stop. In step S18, the operation control unit 104 determines whether to finish the control program. In the case where the control program is not to be finished, the processing returns to step S11. In the case where the control program is to be finished, the operation control unit 104 finishes the processing.

The above-described operation by the robot control device 100 enables to prevent the interference between the operator 400 and the robot 200 from occurring. That is, the operation by the robot control device 100 enables to prevent the arm of the robot 200 from intruding on the work table 501 during when the operator 400 is operating on the work table 501. The description above is about the example of preventing the interference between the operator 400 and the robot 200. The same applies to the case where a person other than the operator 400, for example, a manager wearing a working cap with the QR code attached to the head top approaches the robot 200.

The functional blocks included in the robot control device 100 and the operation thereof have been described so far. In order to realize the functional blocks of the robot control device 100, the robot control device 100 includes an arithmetic processing unit such as a CPU (central processing unit). The robot control device 100 further includes an auxiliary storage device such as an HDD (hard disk drive) storing various types of control programs such as application software and OS (operating system), and a main storage device such as a RAM (random access memory) configured to store data temporarily required when the arithmetic processing unit executes a program.

Then, in the robot control device 100, the arithmetic processing unit reads such application software and OS from the auxiliary storage device, expands the read application software and the OS in the main storage device, and executes arithmetic processing on the basis of the application software and the OS. On the basis of the arithmetic result, various types of hardware included in respective devices are controlled. As a result, the functional blocks or the present embodiment are realized. That is, the present embodiment is realized by cooperation of hardware and software.

<Example of Work Process>

Figure 5:
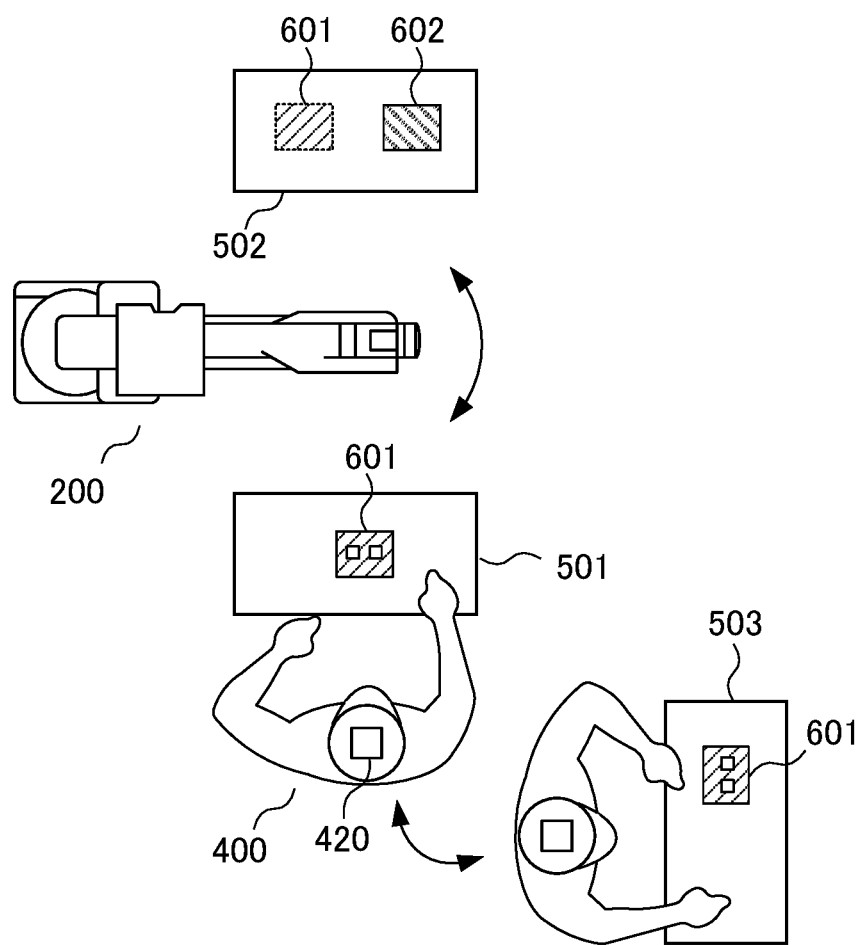
FIG. 5 shows an example of a work process by use of the robot control system.

An example of the work process by use of the robot control system 10 is described below by referring to FIG. 5. The robot 200 carries a workpiece-in-process 601 placed on a work table 502 onto the work table 501 by using the arm, and then moves the arm toward the work table 502 in order to carry a next workpiece-in-process 602 placed on the work table 502. At this time, it is assumed that the operator 400 faces a work table 503, not being positioned in the vicinity of the work table 501. The operator 400 moves from the work table 503 to the work table 501, attaches two parts to the workpiece-in-process 601 placed on the work table 501, and carries the workpiece-in-process 601 to the next work table 503. The operator 400 then inspects the workpiece-in-process 601 with the two parts attached, on the work table 503 by using an inspection device. During when the operator 400 is inspecting the workpiece-in-process 601 on the work table 503, the robot 200 carries the workpiece-in-process 602 placed on the work table 502 onto the work table 501 by using the arm.

In the above-described work process, the operator 400 is not positioned in the vicinity of the work table 501 during when the robot 200 carries the workpiece-in-process 601 onto the work table 501, and thus the interference probability between the robot 200 and the operator 400 is 0%. When the robot 200 carries the workpiece-in-process 601 onto the work table 501 by the arm, and thereafter moves the arm toward the work table 502, the interference probability becomes 0% even when the operator 400 is positioned in the vicinity of the work table 501.

However, when the robot 200 is about to carry the workpiece-in-process 602 placed on the work table 502 onto the work table 501 by using the arm, and if the operator 400 is in the step of attaching the two parts to the workpiece-in-process 601 on the work table 501, the interference between the operator 400 and the robot 200 may occur.

When the interference probability becomes 50%, the robot control device 100 reduces the speed of the arm of the robot 200 to 20% to the normal speed when the distance d becomes 0 and when the interference probability becomes 100% or before the interference probability becomes 100%, the robot control device 100 prevents the interference by controlling the arm of the robot 200 to stop. Thereafter, when the operator 400 moves to carry the workpiece-in-process 601 (product) with the two parts attached onto the work table 503, the robot control device 100 controls the robot 200 to carry the workpiece-in-process 602 onto the work table 501 after the interference probability becomes 0%.

As described above, the robot control device 100 according to the present embodiment controls the robot 200 by calculating the interference probability between the robot 200 and the operator 400 in order to avoid the interference between the robot 200 and the operator 400.

It noted that the robot control device described above is realized by hardware, software, or the combination thereof. A robot control method to be executed by the cooperation of respective devices included in the robot control system described above is also realized by hardware, software, or the combination thereof. The above expression of "being realized by software" means being realized when a computer reads and executes a program.

A program is able to be stored by various types of non-transitory computer readable media, and is able to be supplied to a computer. The non-transitory computer readable media include various types of tangible storage media. Examples of non-transitory computer-readable media include magnetic recording media (for example, flexible disk and hard disk drive), magneto-optical recording media (for example, magneto-optical disk), CD-ROM (read only memory), CD-R, CD-R/W, semiconductor memory (for example, mask ROM, PROM (programmable ROM), EPROM (erasable PROM), flash ROM, and RAM (random access memory). A program may also be supplied to a computer by various types of transitory computer readable media. Although the above-described embodiment is a preferred embodiment of the present invention, the scope of the present invention is not limited only to the above-described embodiment. Various modifications are available without departing from the gist of the present invention. For example, modifications with the following changes are available.

<Modification 1>

In the embodiment described above, the robot control device 100 controls the operation of the robot 200, on the basis of the image data including the QR code (registered trademark) 210 and the QR code 420 captured by the camera 300. The QR code 420 includes information such as an operator ID and physical characteristics of the operator, and the QR code 210 includes information such as a robot ID and a robot size. As a modification, the QR code 420 may include only an operator ID, and the QR code 210 may include only a robot ID. In this case, the distance estimation unit 102 previously stores information such as physical characteristics of an operator in association with an operator ID, and previously stores information such as a robot size in association with a robot ID. With this manner, the distance estimation unit 102 is able to obtain the distance d.

<Modification 2>

In the above-described embodiment, it is assumed that the robot control device 100 and the robot 200 are realized in individual devices. As a modification, the robot control device 100 and the robot 200 may be realized in one device. Alternatively, some or the all of the functional blocks of the robot control device 100 may be realized in the same device as the robot 200.

<Modification 3>

In the above-described embodiment, it is assumed that the robot 200 and the operator 400 are under a one-to-one relation. As a modification, the present embodiment may be applied to the case where the robot 200 and the operator 400 are under a one-to-multiple relation, a multiple-to-one relation, or a multiple-to-multiple relation.

EXPLANATION OF REFERENCE NUMERALS

10 ROBOT CONTROL SYSTEM
100 ROBOT CONTROL DEVICE
101 INFORMATION ACQUISITION UNIT
102 DISTANCE ESTIMATION UNIT
103 INTERFERENCE PROBABILITY CALCULATION UNIT
104 OPERATION CONTROL UNIT
200 ROBOT
300 CAMERA
400 OPERATOR
501, 502, 503 WORK TABLE

What is claimed is:

1. A robot control device configured to control a robot operating in a shared work area with an operator, the robot control device comprising:
   a hardware processor configured to execute at least one program and cause the robot control device to:
   capture an image of the operator and the robot;
   obtain first imaged data of a bar code or a QR code attached to the operator and second imaged data of a bar code or a QR code attached to the robot, from the captured image;
   determine a reachable range of the operator, based on position of the bar code or the QR code of the first imaged data and information on physical characteristics of the operator obtained based on the bar code or the QR code of the first imaged data;
   obtain a distance between the reachable range and the robot, based on position of the bar code or the QR code of the second imaged data, information on shape of the robot obtained based on the bar code or the QR code of the second imaged data, and the reachable range;
   obtain an interference probability between the robot and the operator based on the distance; and
   control operation of the robot based on the interference probability.

2. The robot control device according to claim 1, wherein the operation control unit determines a speed of an arm of the robot based on the interference probability.

3. The robot control device according to claim 2, wherein the operation control unit determines the speed of the arm of the robot depending on a moving direction of the arm of the robot.

4. The robot control device according to claim 1, wherein the bar code or the QR code attached to the operator includes information indicating an operator ID and the physical characteristics of the operator, and the bar code or the QR code attached to the robot includes information indicating a robot ID and a robot size.

5. A robot control system comprising:
the robot control device according to claim 1;
a robot configured to be controlled by the robot control device; and
a camera configured to capture the image or images of an operator and the robot.

6. A robot control method for a robot control device configured to control a robot operating in a shared work area with an operator, the robot control method comprising the steps of:

capturing an image of the operator and the robot;
obtaining first imaged data of a bar code or a QR code attached to the operator and second imaged data of a bar code or a QR code attached to the robot, from the captured image;
determining a reachable range of the operator, based on position of the bar code or the QR code of the first image data and information on physical characteristics of the operator obtained based on the bar code or the QR code of the first imaged data;
obtaining a distance between the reachable range and the robot, based on position of the bar code or the QR code of the second imaged data, information on shape of the robot obtained based on the bar code or the QR code of the second imaged data, and the reachable range;
obtaining an interference probability between the robot and the operator based on the distance; and
controlling operation of the robot based on the interference probability.

* * * * *